United States Patent
Ono et al.

(10) Patent No.: US 10,644,294 B2
(45) Date of Patent: May 5, 2020

(54) SECONDARY BATTERY

(71) Applicant: TOYOTA JIDOSHA KABUSHIKI KAISHA, Toyota-shi, Aichi-ken (JP)

(72) Inventors: Tomohiro Ono, Miyoshi (JP); Yuta Nemoto, Toyota (JP); Takashi Takimoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 9 days.

(21) Appl. No.: 15/715,343

(22) Filed: Sep. 26, 2017

(65) Prior Publication Data
US 2018/0090738 A1 Mar. 29, 2018

(30) Foreign Application Priority Data
Sep. 29, 2016 (JP) .................................. 2016-191498

(51) Int. Cl.
*H01M 2/26* (2006.01)
*H01M 2/34* (2006.01)
(Continued)

(52) U.S. Cl.
CPC ............. *H01M 2/26* (2013.01); *H01M 2/021* (2013.01); *H01M 2/0217* (2013.01);
(Continued)

(58) Field of Classification Search
CPC ..... H01M 10/04; H01M 10/045–0459; H01M 10/05–0525; H01M 10/058–0587;
(Continued)

(56) References Cited

U.S. PATENT DOCUMENTS

| 6,228,523 B1 * | 5/2001 | Azema | ................... H01M 2/34 429/57 |
| 6,274,264 B1 * | 8/2001 | Azema | ................... H01M 2/34 429/53 |

(Continued)

FOREIGN PATENT DOCUMENTS

| JP | 09180698 A | * | 7/1997 |
| JP | 11-307080 A | | 11/1999 |

(Continued)

OTHER PUBLICATIONS

Machine translation of Yamahira (JP 09-180698). (Year: 1997).*

*Primary Examiner* — Jonathan G Leong
*Assistant Examiner* — Jacob Buchanan
(74) *Attorney, Agent, or Firm* — Sughrue Mion, PLLC

(57) ABSTRACT

A secondary battery according to the present disclosure includes a battery case, an electrode member contained in the battery case, and a lid configured to hermetically seal the battery case. A current-carrying part, which electrically connects a collector terminal of the electrode member with an external electrode terminal, includes a displacement part configured to be displaced outward in response to a rise in an internal pressure of the battery case, the displacement part being connected to at least a part of the collector terminal. When the displacement part is displaced outward in response to the rise in the internal pressure of the battery case, the connection between the displacement part and the collector terminal is disconnected and the current-carrying part is electrically cut off from the collector terminal. In the secondary battery according to the present disclosure, the current-carrying part including the displacement part is disposed in the lid.

6 Claims, 13 Drawing Sheets

(51) Int. Cl.
*H01M 2/02* (2006.01)
*H01M 10/052* (2010.01)
(52) U.S. Cl.
CPC .......... *H01M 2/345* (2013.01); *H01M 10/052* (2013.01); *H01M 2200/20* (2013.01)
(58) Field of Classification Search
CPC ......... H01M 10/52; H01M 2/12–1294; H01M 2/20–348
See application file for complete search history.

(56) References Cited

U.S. PATENT DOCUMENTS

| | | | |
|---|---|---|---|
| 6,296,965 B1 * | 10/2001 | Azema | H01M 2/34 429/57 |
| 6,376,120 B1 | 4/2002 | Azema | |
| 2009/0148767 A1 * | 6/2009 | Yamashita | H01M 2/0426 429/181 |
| 2010/0167107 A1 * | 7/2010 | Byun | H01M 2/1229 429/56 |
| 2011/0300419 A1 * | 12/2011 | Byun | H01M 2/22 429/61 |
| 2012/0315516 A1 * | 12/2012 | Kim | H01M 10/0525 429/61 |
| 2016/0336579 A1 | 11/2016 | Nemoto et al. | |
| 2017/0025669 A1 | 1/2017 | Urano et al. | |
| 2017/0373303 A1 | 12/2017 | Ito | |

FOREIGN PATENT DOCUMENTS

| | | |
|---|---|---|
| JP | 2000-3702 A | 1/2000 |
| JP | 2005-285404 A | 10/2005 |
| JP | 2016-095930 A | 5/2016 |
| JP | 2016-219394 A | 12/2016 |
| WO | 2015/156270 A1 | 10/2015 |
| WO | 2016/104734 A1 | 6/2016 |
| WO | 2017/119421 A1 | 7/2017 |

* cited by examiner

SECONDARY BATTERY

CROSS REFERENCE TO RELATED APPLICATIONS

This application is based upon and claims the benefit of priority from Japanese patent application No. 2016-191498, filed on Sep. 29, 2016, the disclosure of which is incorporated herein in its entirety by reference.

BACKGROUND

The present disclosure relates to a secondary battery, and in particular to a secondary battery including a current interrupt mechanism.

In some cases, a lithium-ion secondary battery is equipped with a current interrupt mechanism (or a CID (Current Interrupt Device) mechanism) that interrupts (i.e., cuts off) a current when an internal pressure of the battery reaches or exceeds a predetermined value as a safety measure against overcharging. When the lithium-ion secondary battery is overcharged, its electrolyte is decomposed and a gas is generated. The current interrupt mechanism detects a rise in the internal pressure caused by the generated gas when the overcharging occurs, and stops the charging to the lithium-ion secondary battery.

Japanese Unexamined Patent Application Publication No. 2016-95930 discloses a technique related to such a lithium-ion secondary battery equipped with a current interrupt mechanism. In the lithium-ion secondary battery disclosed in Japanese Unexamined Patent Application Publication No. 2016-95930, the current interrupt mechanism is formed by using a reverse plate that is displaced (or deformed) according to a pressure inside a battery case. Specifically, when the internal pressure of the battery case rises and exceeds an operating pressure, the central part of the reverse plate is pressed upward and deformed so that it is raised upward. As a result, a connection point between the reverse plate and a collector terminal is electrically disconnected and hence a conduction path in the current interrupt mechanism is severed. Consequently, a charge/discharge current flowing through the current interrupt mechanism is cut off.

SUMMARY

The present inventors have found the following problem. As explained above in the Background section, the current interrupt mechanism is formed by using the reverse plate that is displaced according to the pressure inside the battery case in the technique disclosed in Japanese Unexamined Patent Application Publication No. 2016-95930. However, in the technique disclosed in Japanese Unexamined Patent Publication No. 2016-95930, a large number of components such as the reverse plate, an insulating member, a swaging member, a relay member, an internal terminal member, and a packaging member are stacked to form the current interrupt mechanism. Therefore, there is a problem that the thickness of the current interrupt mechanism becomes large when the current interrupt mechanism is formed as described above.

In view of the above-described circumstances, an object of the present disclosure is to reduce the thickness of a current interrupt mechanism provided in a secondary battery.

A first exemplary aspect is a secondary battery including a battery case, an electrode member contained in the battery case, and a lid configured to hermetically seal the battery case, in which a current-carrying part, which electrically connects a collector terminal of the electrode member with an external electrode terminal, includes a displacement part configured to be displaced outward in response to a rise in an internal pressure of the battery case, the displacement part being connected to at least a part of the collector terminal, when the displacement part is displaced outward in response to the rise in the internal pressure of the battery case, the connection between the displacement part and the collector terminal is disconnected and the current-carrying part is electrically cut off from the collector terminal. In the secondary battery according to the present disclosure, the current-carrying part including the displacement part is disposed in the lid.

In the secondary battery having the above-described configuration according to the present disclosure, the current-carrying part including the displacement part is disposed in the lid. Therefore, the thickness of the current interrupt mechanism can be reduced compared to the case where a reverse plate (corresponding to the displacement part of the present disclosure) is provided separately from the lid and a current interrupt mechanism is formed by stacking this reverse plate in the thickness direction of the lid as in the case of the current interrupt mechanism disclosed in in Japanese Unexamined Patent Application Publication No. 2016-95930.

Further, in the above-described secondary battery, a breakable part may be formed around a junction part of the collector terminal at which the collector terminal is joined with the displacement part, and when the displacement part is displaced outward in response to the rise in the internal pressure of the battery case, the breakable part is broken and hence the current-carrying part is electrically cut off from the collector terminal.

By providing the breakable part having a strength weaker than that of the other part of the collector terminal as described above, it is possible to make the collector terminal break at the breakable part foremost when the displacement part is displaced outward in response to the rise in the internal pressure of the battery case. Therefore, it is possible to stabilize the operation of the current interrupt mechanism.

Further, in the above-described secondary battery, the current-carrying part may have a plate-like shape, and the displacement part may be formed with a thickness smaller than the thickness of an area around the displacement part so that the displacement part is displaced in a thickness direction of the current-carrying part.

By making a part of the current-carrying part thinner and forming that part as the displacement part as described above, the current-carrying part and the displacement part can be integrally formed. Consequently, there is no need to carry out a process for joining the displacement part with the current-carrying part, thus enabling the displacement part to operate in a stable manner.

Further, in the above-described secondary battery, the collector terminal may have a plate-like shape at least in a part opposed to the current-carrying part. The current-carrying part and the collector terminal may be arranged so that their principal surfaces are parallel to each other. The collector terminal may be fixed to the current-carrying part by using a terminal fixing member made of a resin material. The displacement part may be joined with the collector terminal at a part where the displacement part does not overlap the terminal fixing member when the current-carrying part and the collector terminal are viewed from above in a state in which the displacement part is displaced toward an inside of the battery case.

By joining the displacement part with the collector terminal at a part where the displacement part does not overlap the terminal fixing member when the current-carrying part and the collector terminal are viewed from above as described above, it is possible to reduce the thickness of the current interrupt mechanism to the thickness of a stack of the lid, the collector terminal, and the terminal fixing member and thereby to form the current interrupt mechanism with a reduced thickness.

Further, in the above-described secondary battery, when the current-carrying part and the collector terminal are viewed from above, the displacement part may have a circular shape. The junction part at which the displacement part is joined with the collector terminal may have a circular shape. The breakable part may be formed in a circular shape around the junction part of the collector terminal.

By forming each of the displacement part, the junction part, and the breakable part in a circular shape in a plan view (i.e., when they are viewed from above) as described above, it is possible to make a stress propagate uniformly from the displacement part to the junction part and to make the breakable part break uniformly. Therefore, it is possible to stabilize the operation of the current interrupt mechanism.

Further, in the above-described secondary battery, the breakable part may be formed by cutting out a surface of the plate-like collector terminal on the electrode member side in such a manner that the breakable part surrounds the junction part. By forming the breakable part by cutting out the collector terminal so that the collector terminal surrounds the junction part as described above, it is possible to make the breakable part break uniformly and thereby to stabilize the operation of the current interrupt mechanism.

Further, in the above-described secondary battery, the breakable part may be formed by reducing the thickness of a part of the plate-like collector terminal including a periphery of the junction part. By forming the breakable part by reducing the thickness of the part including the periphery of the junction part as described above, it is possible to make the breakable part break uniformly and thereby to stabilize the operation of the current interrupt mechanism.

According to the present disclosure, it is possible to reduce the thickness of a current interrupt mechanism provided in a secondary battery.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Embodiments according to the present disclosure are explained hereinafter with reference to the drawings.

Figure 1:
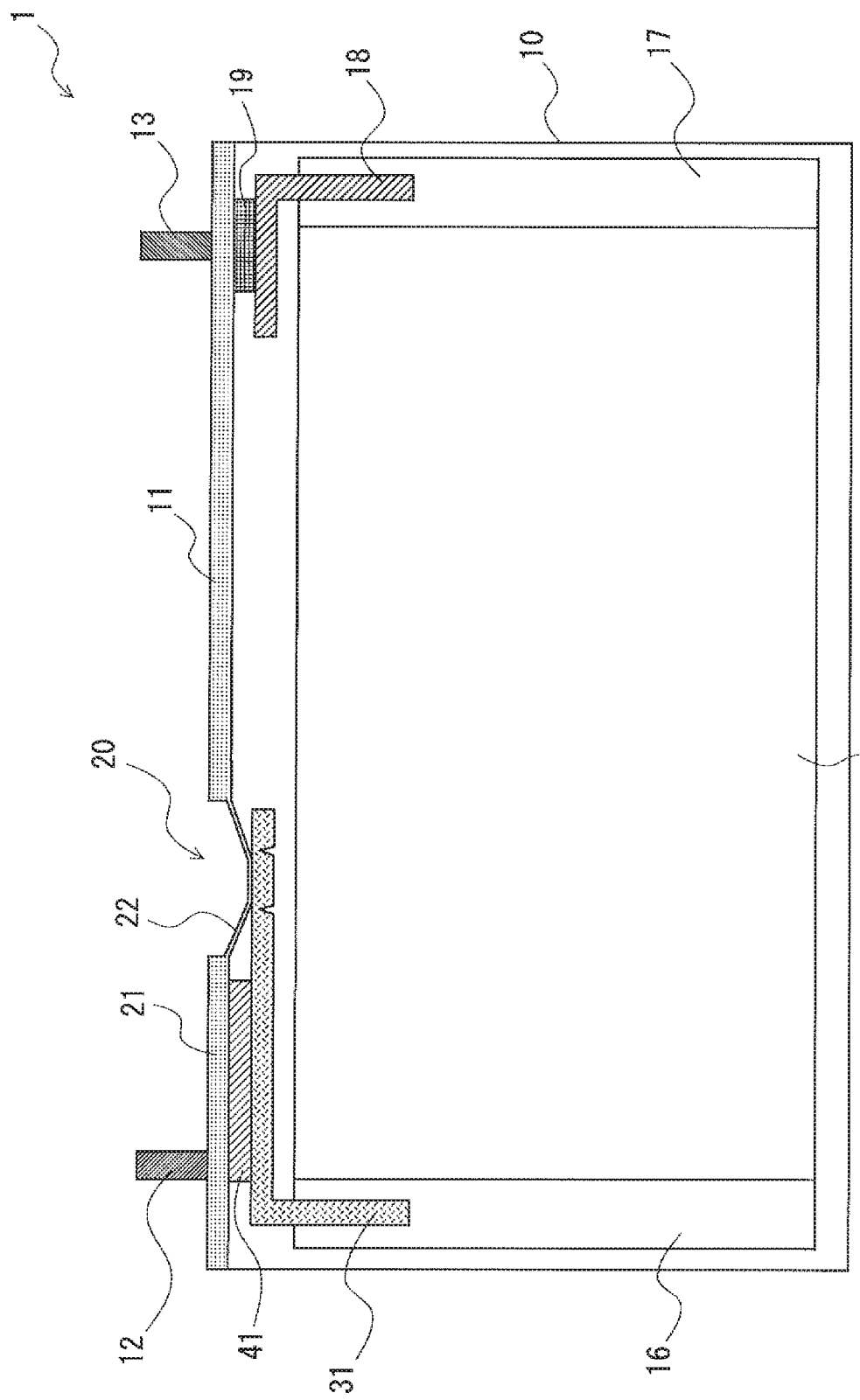
FIG. 1 is a cross section showing a secondary battery according to an embodiment.

FIG. 1 is a cross section showing a secondary battery according to an embodiment. As shown in FIG. 1, a secondary battery 1 according to this embodiment includes a battery case 10, an electrode member 15 contained in the battery case 10, and a lid 11 that hermetically seals the battery case 10. The secondary battery 1 according to this embodiment is, for example, a lithium-ion secondary battery.

The battery case 10 is a rectangular-parallelepiped case with an internal space formed therein and has an opening on the top. The plate-like lid 11 for closing the opening of the battery case 10 is provided at the top of the battery case 10. By closing the opening of the battery case 10 by using the lid 11 as described above, the inside of the battery case 10 can be hermetically sealed.

The battery case 10 contains the electrode member 15 inside thereof. The electrode member 15 is, for example, a wound-type electrode member that is formed by winding a band-like positive plate and a band-like negative plate while piling them on each other with a band-like separator interposed therebetween, and compressing them into a flat shape. The positive plate includes a positive collector member, and positive mixture-agent layers containing a positive active material that are formed on both sides of the positive collector member. The negative plate includes a negative collector member, and negative mixture-agent layers containing a negative active material that are formed on both sides of the negative collector member. In addition to the electrode member 15, an electrolyte is injected (or poured) into the inside of the battery case 10.

As shown in FIG. 1, the positive collector member 16 of the electrode member 15 is exposed on the positive side and connected to a collector terminal 31. Further, the negative collector member 17 of the electrode member 15 is exposed on the negative side and connected to a collector terminal 18.

External electrode terminals 12 and 13 are provided on the top surface of the lid 11. The collector terminal 18 on the negative side is electrically connected to the negative-side external electrode terminal 13. For example, when the lid 11 is made of a metal material, the lid 11 is electrically insulated from the external electrode terminal 13. Further, the collector terminal 18 is fixed to the lid 11 by using a terminal fixing member 19 made of a resin material. Note that the collector terminal 18 is electrically connected to the external electrode terminal 13 while being insulated from the lid 11.

As shown in FIG. 1, a current interrupt mechanism 20 is formed at the top of the secondary battery 1. The lid 11 includes a current-carrying part 21 that electrically connects the collector terminal 31 with the external electrode terminal 12. The current-carrying part 21 includes a displacement part (or a deformation part) 22 that is displaced (or deformed) outward in response to a rise in the internal pressure of the battery case 10. The collector terminal 31 is fixed to the current-carrying part 21 by using a terminal fixing member 41 made of a resin material. Further, the collector terminal 31 is connected to at least a part of the displacement part 22. A configuration of the current interrupt mechanism 20 is explained hereinafter in detail with reference to FIGS. 2 to 4.

Figure 2:
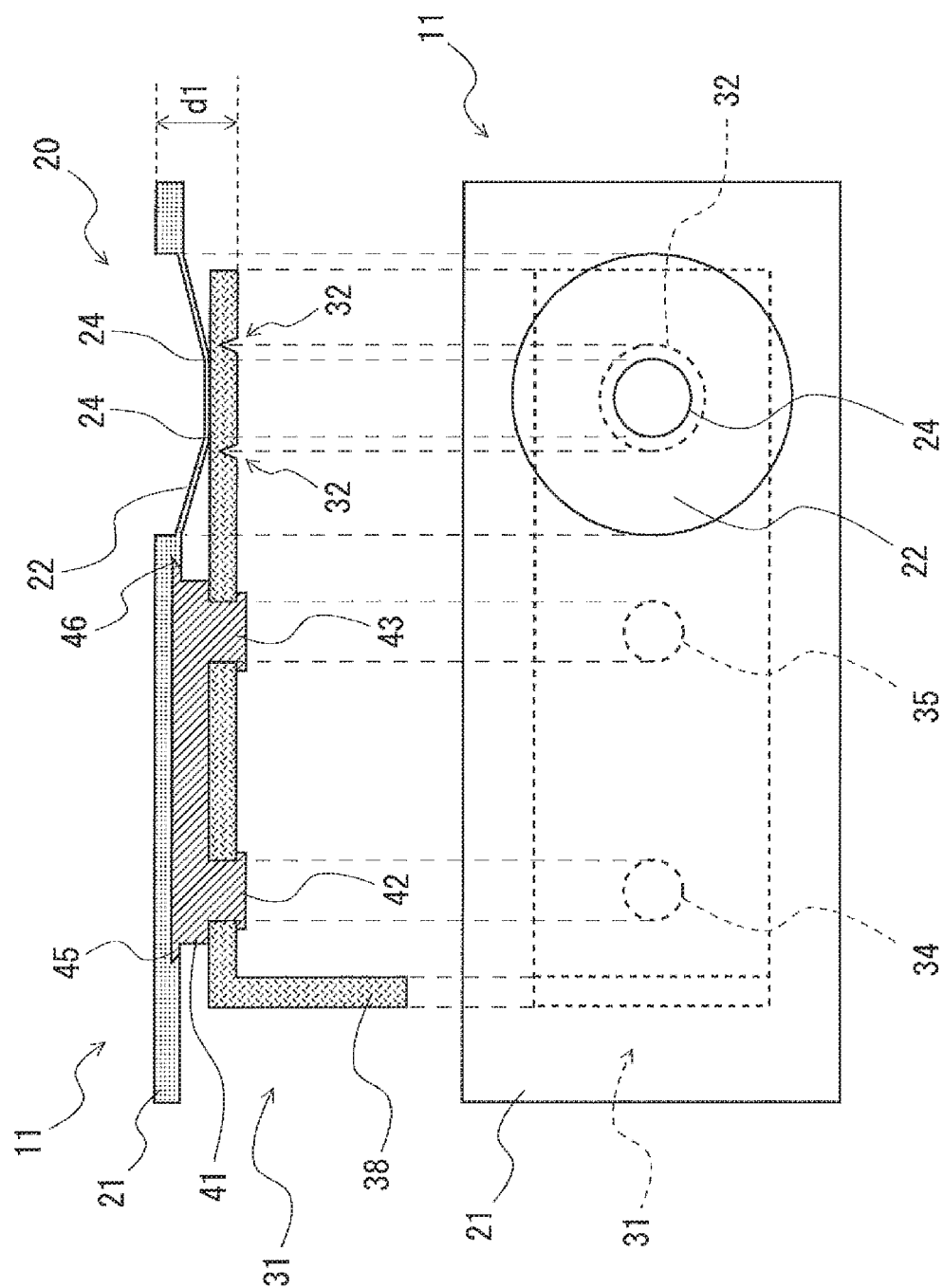
FIG. 2 shows a cross section and a plan view of a current interrupt mechanism provided in a secondary battery according to an embodiment.
Figure 3:
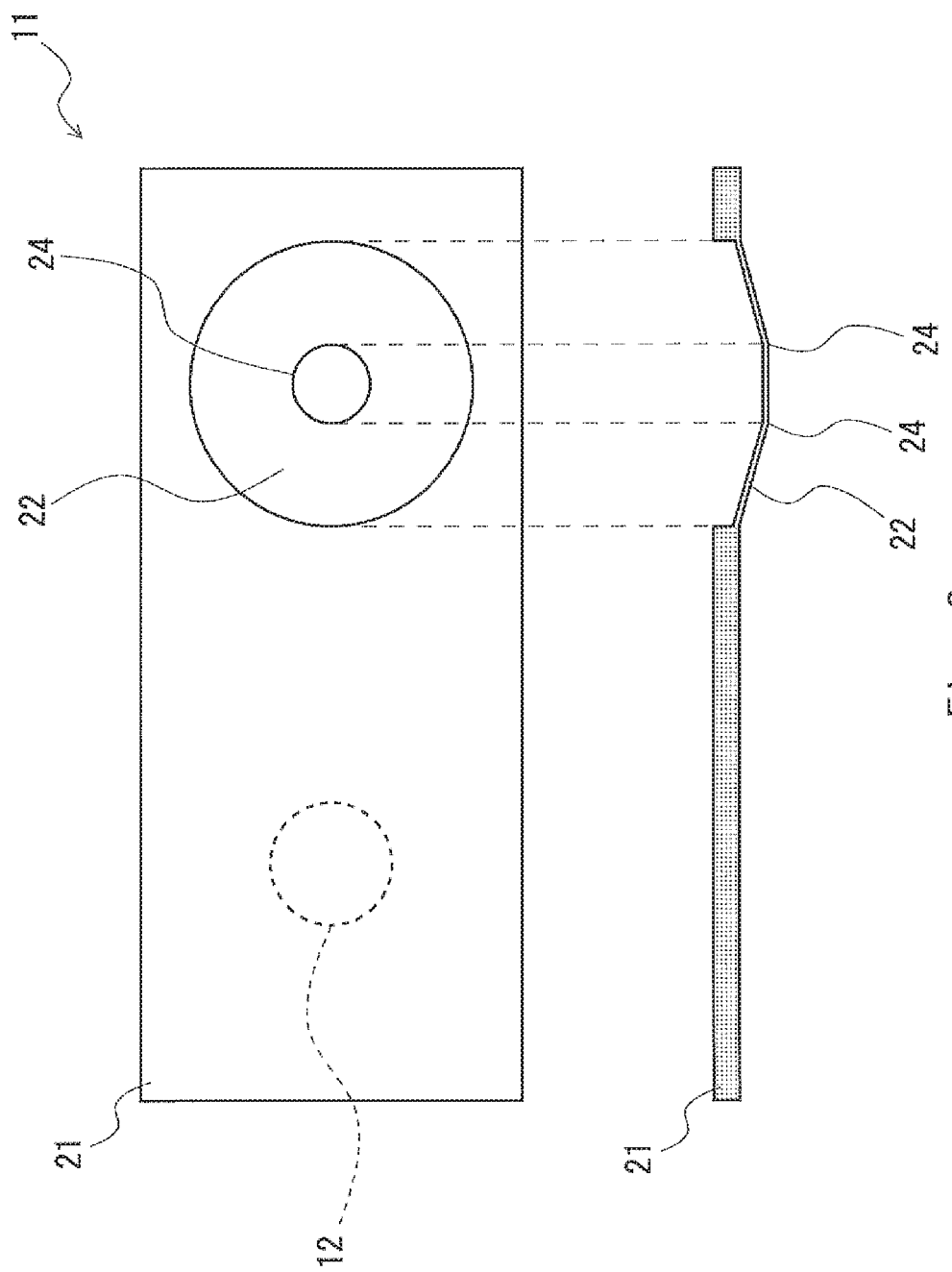
FIG. 3 shows a plan view and a cross section showing a configuration example of a lid near a current interrupt mechanism.
Figure 4:
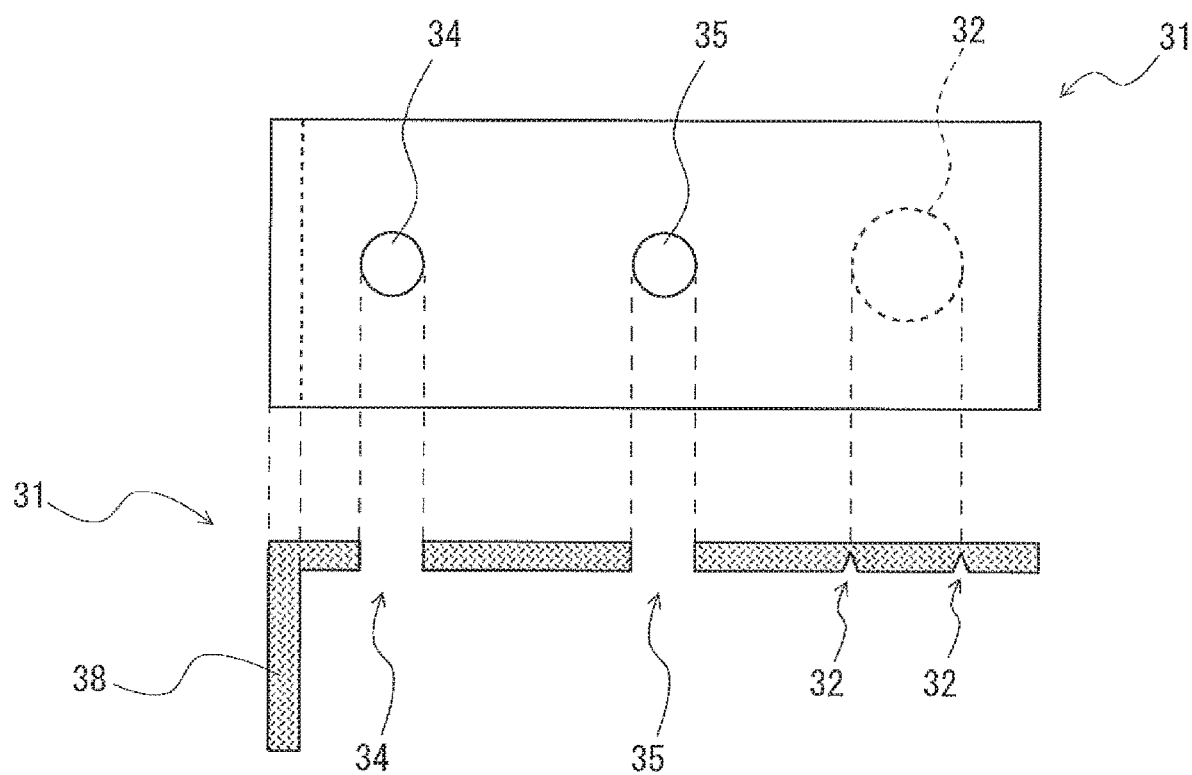
FIG. 4 shows a plan view and a cross section showing a configuration example of a collector terminal.

FIG. 2 shows a cross section and a plan view of the current interrupt mechanism 20 disposed in the secondary battery according to this embodiment. FIG. 3 shows a plan view and a cross section showing a configuration example of the lid 11 near the current interrupt mechanism 20. FIG. 4 shows a plan view and a cross section showing a configuration example of the collector terminal 31. Note that in the plan view shown in FIG. 2, the lid 11 is indicated by solid lines and the collector terminal 31 is indicated by broken lines.

Figure 6:
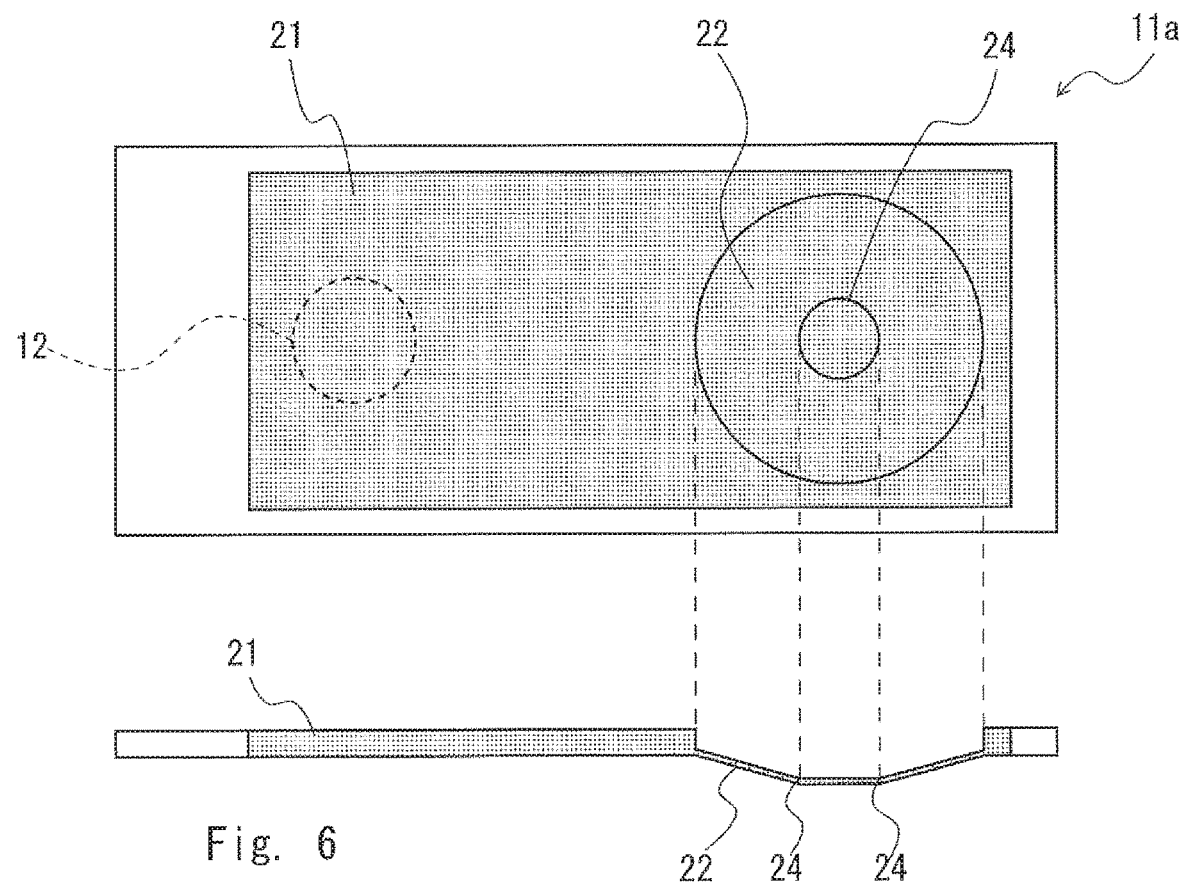
FIG. 6 shows a plan view and a cross section showing another configuration example of a lid near a current interrupt mechanism.

As shown in FIGS. 2 and 3, the lid 11 includes the current-carrying part 21. As shown in FIG. 3, the current-carrying part 21 is formed so that a current flows between a junction part 24 and the external electrode terminal 12. For example, the lid 11 may be entirely formed of a metal material so that the current-carrying part 21 is formed. Further, as shown in another configuration example of a lid 11a shown in FIG. 6, the main part of the lid 11a may be formed of a resin material and an area of the lid 11a including the displacement part 22, the junction part 24, and the external electrode terminal 12 may be formed of a metal material so that the current-carrying part 21 is formed.

Further, as shown FIGS. 2 and 3, the displacement part 22 is formed in the current-carrying part 21. The displacement part 22 is formed so that it can be displaced outward in response to a rise in the internal pressured of the battery case 10. For example, the current-carrying part 21 may have a plate-like shape, and the displacement part 22 can be formed by making a part of the current-carrying part 21 corresponding to the displacement part 22 thinner than the other part of the current-carrying part 21. For example, the displacement part 22 has a circular shape in a plan view (i.e., when viewed from above). In the example shown in FIGS. 2 and 3, the displacement part 22 is formed by shaving the top surface of a part of the current-carrying part 21 corresponding to the displacement part 22. By forming the displacement part 22 by shaving the top surface of the current-carrying part 21 as described above, the lid 11 (the current-carrying part 21) and the displacement part 22 can be integrally formed. Further, the displacement part 22 is formed in a state in which the displacement part 22 is displaced (or deformed) toward the inside of the battery case 10.

As shown in FIGS. 2 and 4, the collector terminal 31 can be formed by bending a plate-like metal material into an L-shape. A side plate 38 of the collector terminal 31 is connected to the positive collector member 16 (see FIG. 1). Holes 34 and 35 are formed in the top plate of the collector terminal 31.

As shown in FIG. 2, the collector terminal 31 has a plate-like shape at least in a part opposed to the current-carrying part 21. Further, the current-carrying part 21 and the collector terminal 31 are arranged so that their principal surfaces are parallel to each other. The collector terminal 31 is fixed to the current-carrying part 21 by using the terminal fixing member 41 made of a resin material. For example, the terminal fixing member 41 can be fixed to the collector terminal 31 by inserting protrusions 42 and 43 of the terminal fixing member 41 into the holes 34 and 35 of the collector terminal 31 and melting the protrusions 42 and 43 with heat so that they are thermally welded. Further, for example, the terminal fixing member 41 can be fixed to the current-carrying part 21 by forming recesses for press-fitting on the bottom surface of the current-carrying part 21 and press-fitting protrusions 45 and 46 of the terminal fixing member 41 into the recesses.

Further, as shown in FIGS. 2 and 4, a breakable part 32 is formed in the collector terminal 31. The breakable part 32 is formed around the junction part 24 at which the collector terminal 31 is joined with the displacement part 22. For example, the breakable part 32 can be formed by cutting out the surface of the collector terminal 31 on the electrode member side (i.e., the bottom surface of the collector terminal 31) in such a manner that the breakable part 32 surrounds the junction part 24. In the example shown in FIG. 2, the displacement part 22 is joined with the collector terminal 31 in such a manner that the part at which they are joined has a circular shape, and the breakable part 32 is formed in a circular shape around the junction part 24 of the collector terminal 31. The breakable part 32 is a part having a strength weaker than that of the other part of the collector terminal 31. Therefore, when the displacement part 22 is displaced outward in response to a rise in the internal pressure of the battery case 10, the breakable part 32 is broken and hence the current-carrying part 21 is electrically cut off from the collector terminal 31.

As shown in FIG. 2, the displacement part 22 is joined with the collector terminal 31 at a part where the displacement part 22 does not overlap the terminal fixing member 41 in a plan view, i.e., is joined with the collector terminal 31 at the junction part 24 in a state in which the displacement part 22 is displaced toward the inside of the battery case 10. For example, laser welding or ultrasonic welding can be used to join the displacement part 22 with the collector terminal 31.

Figure 5A:
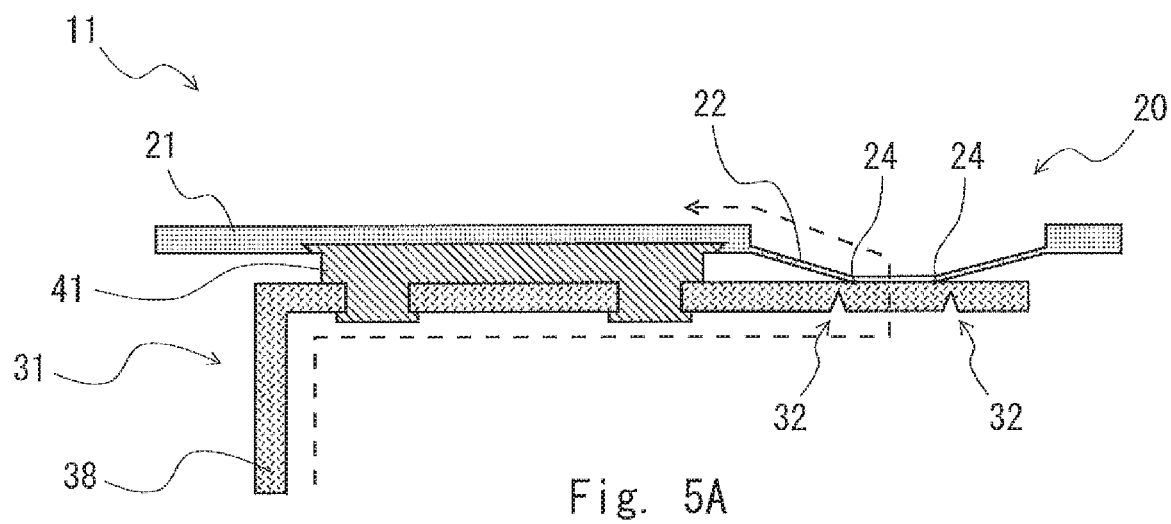
FIG. 5A is a cross section for explaining an operation of a current interrupt mechanism provided in a secondary battery according to an embodiment.
Figure 5B:
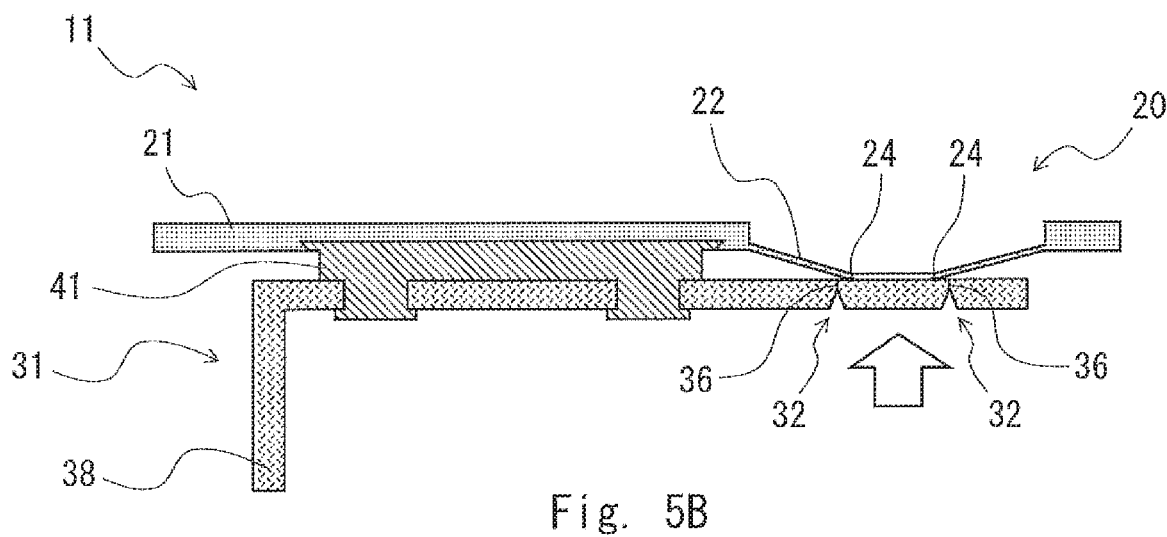
FIG. 5B is a cross section for explaining an operation of a current interrupt mechanism provided in a secondary battery according to an embodiment.
Figure 5C:
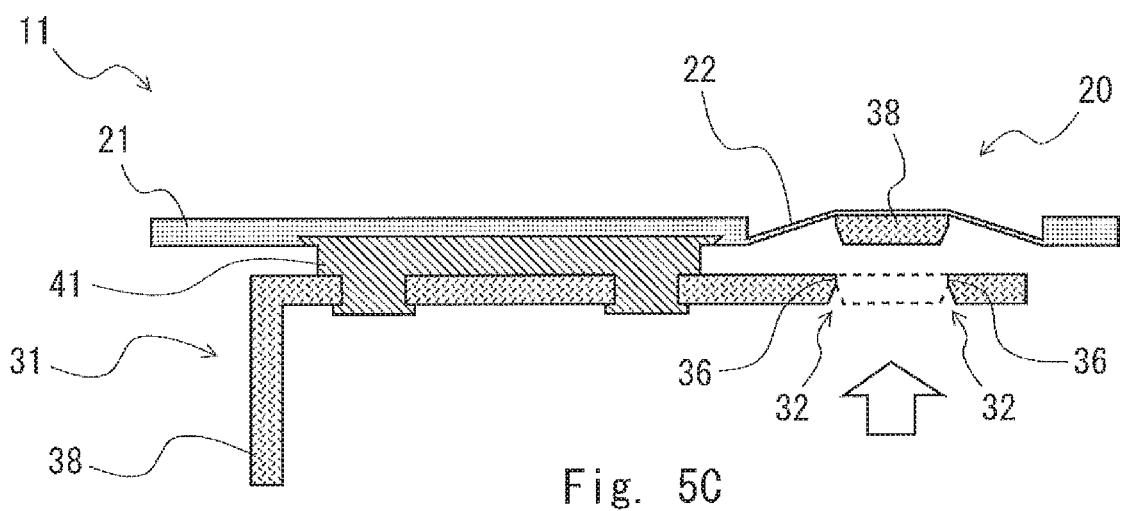
FIG. 5C is a cross section for explaining an operation of a current interrupt mechanism provided in a secondary battery according to an embodiment.

Next, an operation of the current interrupt mechanism 20 provided in the secondary battery 1 is explained with reference to cross sections shown in FIGS. 5A to 5C. As shown in FIG. 5A, when the internal pressure of the battery case 10 is normal, the displacement part 22 is not displaced toward the outside of the battery case 10. Therefore, the breakable part 32 is not broken. In this state, the electrical connection between the collector terminal 31 and the current-carrying part 21 is maintained. In FIG. 5A, a flow of a current is indicated by a broken-line arrow.

In contrast to this, when a gas is generated inside the battery case 10 due to, for example, overcharging, the internal pressure of the battery case 10 rises. In this case, as shown in FIG. 5B, since the displacement part 22 is forced to be displaced outward, an upward stress is exerted on the collector terminal 31 through the junction part 24. When this upward stress exerted on the collector terminal 31 increases, a crack 36 is developed from the tip of the breakable part 32. Then, when this crack 36 reaches the top surface of the collector terminal 31, a part 38 of the collector terminal 31 at which the collector terminal 31 is joined with the displacement part 22 is broken at the breakable part 32 and separated from the other part of the collector terminal 31 as shown in FIG. 5C. As a result, the connection between the collector terminal 31 and the displacement part 22 is disconnected and hence the current-carrying part 21 is electrically cut off from the collector terminal 31.

As explained above, in the secondary battery 1 according to this embodiment, the current-carrying part 21 including the displacement part 22 is disposed in the lid 11. Therefore, the thickness of the current interrupt mechanism can be reduced compared to the case where a reverse plate (corresponding to the displacement part 22) is provided separately from the lid and a current interrupt mechanism is formed by stacking this reverse plate in the thickness direction of the lid as in the case of the current interrupt mechanism disclosed in Japanese Unexamined Patent Application Publication No. 2016-95930.

That is, as shown in FIG. 2, in this embodiment, the current-carrying part 21 including the displacement part 22 is disposed in the lid 11. The collector terminal 31 is fixed to the current-carrying part 21 by using the terminal fixing member 41 made of a resin material. Further, the displacement part 22 is joined with the collector terminal 31 at a part where they do not overlap the terminal fixing member 41 in a plan view. By the above-described configuration, it is possible to reduce the thickness of the current interrupt mechanism 20 to a thickness d1 of a stack of three members, i.e., a stack of the lid 11, the collector terminal 31, and the terminal fixing member 41, and thereby to form the current interrupt mechanism 20 with a reduced thickness.

Figure 16:
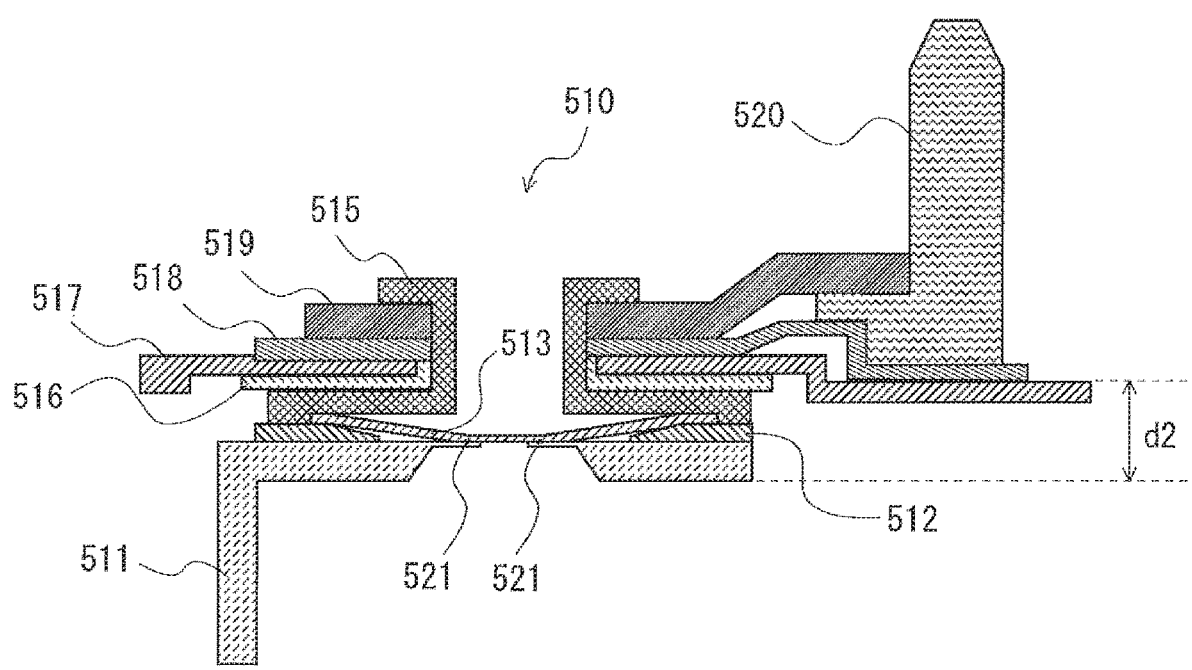
FIG. 16 is a cross section showing a current interrupt mechanism provided in a secondary battery according to a comparative example.

FIG. 16 is a cross section showing a current interrupt mechanism 510 provided in a secondary battery according to a comparative example. As shown in FIG. 16, in the comparative example, the current interrupt mechanism 510 is formed by stacking a collector terminal 511, a holder 512, a reverse plate 513, a rivet 515, a gasket 516, a lid 517, an insulating member 518, and a metal plate 519.

The reverse plate 513 is joined with the collector terminal 511 at a junction part 521. Further, the reverse plate 513 is electrically connected to the metal plate 519 through the rivet 515. The metal plate 519 is connected to an external electrode terminal 520. Therefore, when the internal pressure of the battery case is normal, the collector terminal 511 is connected to the external electrode terminal 520 through the reverse plate 513, the rivet 515, and the metal plate 519.

In contrast to this, when the internal pressure of the battery case rises, the reverse plate 513 is displaced outward and hence the connection between the reverse plate 513 and the collector terminal 511 is disconnected. As a result, the collector terminal 511 is electrically cut off from the external electrode terminal 520.

In the comparative example shown in FIG. 16, since the current interrupt mechanism 510 is formed by stacking the collector terminal 511, the holder 512, the reverse plate 513, the rivet 515, the gasket 516, the lid 517, the insulating member 518, and the metal plate 519, the current interrupt mechanism 510 has a large thickness. For example, the thickness of the stack from the lid 517 to the collector terminal 511 is a thickness d2.

In contrast to this, as shown in FIG. 2, in the secondary battery 1 according to this embodiment, since the current-carrying part 21 including the displacement part 22 is disposed in the lid 11, the thickness of the current interrupt mechanism 20 of the secondary battery 1 can be reduced. That is, the thickness of the current interrupt mechanism 20 can be reduced to the thickness d1 of a stack of three members, i.e., a stack of the lid 11, the collector terminal 31, and the terminal fixing member 41. Therefore, it is possible to reduce the thickness of the current interrupt mechanism 20 compared to the thickness d2 of the current interrupt mechanism 510 according to the comparative example shown in FIG. 16. Since the thickness of the current interrupt mechanism 20 can be reduced as described above, the dead space inside the battery case 10 can be reduced. Consequently, it is possible to increase the ratio of the volume occupied by the electrode member to the internal volume of the battery case and thereby to improve the battery capacity.

Further, in this embodiment, the number of components constituting the current interrupt mechanism 20 can be reduced compared to that of the comparative example shown in FIG. 16. Therefore, the cost for manufacturing the current interrupt mechanism 20 can be reduced.

Further, in the comparative example shown in FIG. 16, it is necessary to join the reverse plate 513 with the rivet 515, and because of heat and vibrations caused in this joining process, there are cases in which there are considerable variations in the performances of the current interrupt mechanisms 510. In contrast to this, in this embodiment, the lid 11 (the current-carrying part 21) and the displacement part 22 can be integrally formed. That is, there is no need to carry out welding for the junction part between the lid 11 (the current-carrying part 21) and the displacement part 22. Therefore, it is possible to prevent or reduce the occurrences of variations in the performances of the current interrupt mechanisms 20. Further, the operation of the current interrupt mechanism 20 can be stabilized. Further, the cost for manufacturing the current interrupt mechanism 20 can be reduced.

Further, in the comparative example, various members are fixed by forming holes in the lid 517 and inserting the rivet 515 through these holes. Therefore, it is necessary to dispose the gasket 516 in order to maintain the hermetical property inside the battery case. In contrast to this, in this embodiment, since the lid 11 (the current-carrying part 21) and the displacement part 22 are integrally formed, there is no need to form holes in the lid 11 and the gasket is also unnecessary. Therefore, it is possible to maintain the hermetical property inside the battery case.

Figure 7:
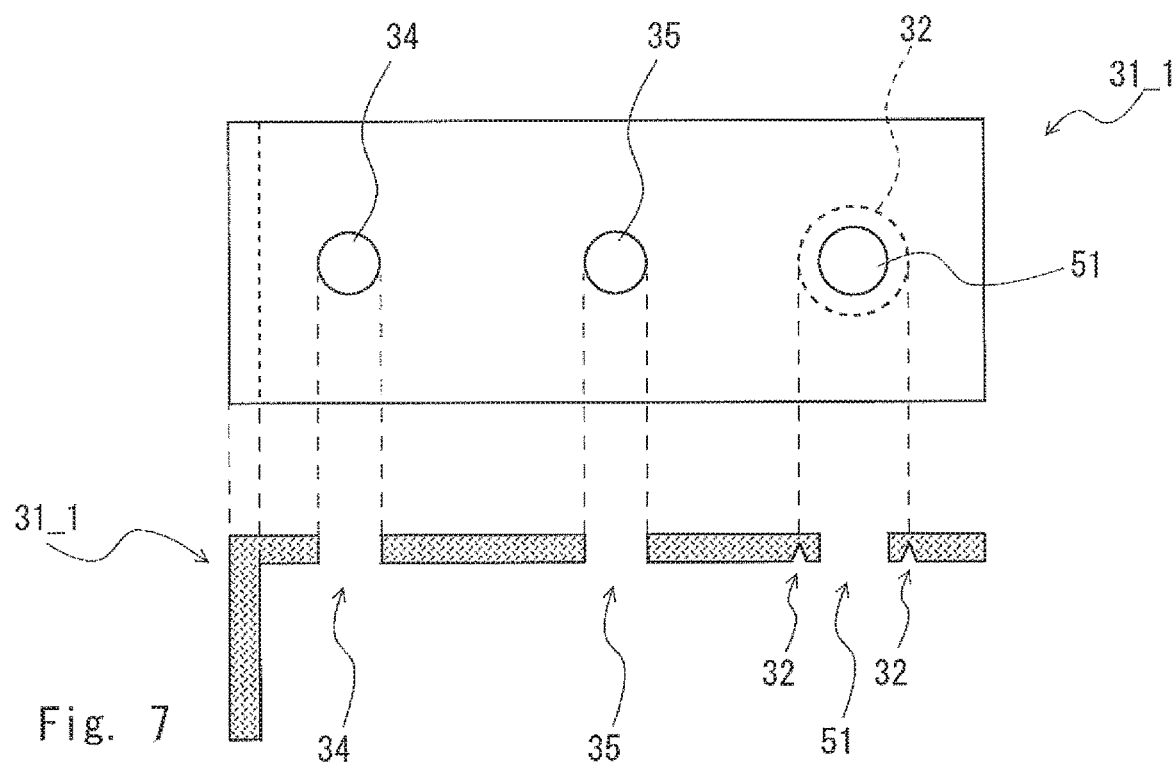
FIG. 7 shows a plan view and a cross section showing another configuration example of a collector terminal.
Figure 8:
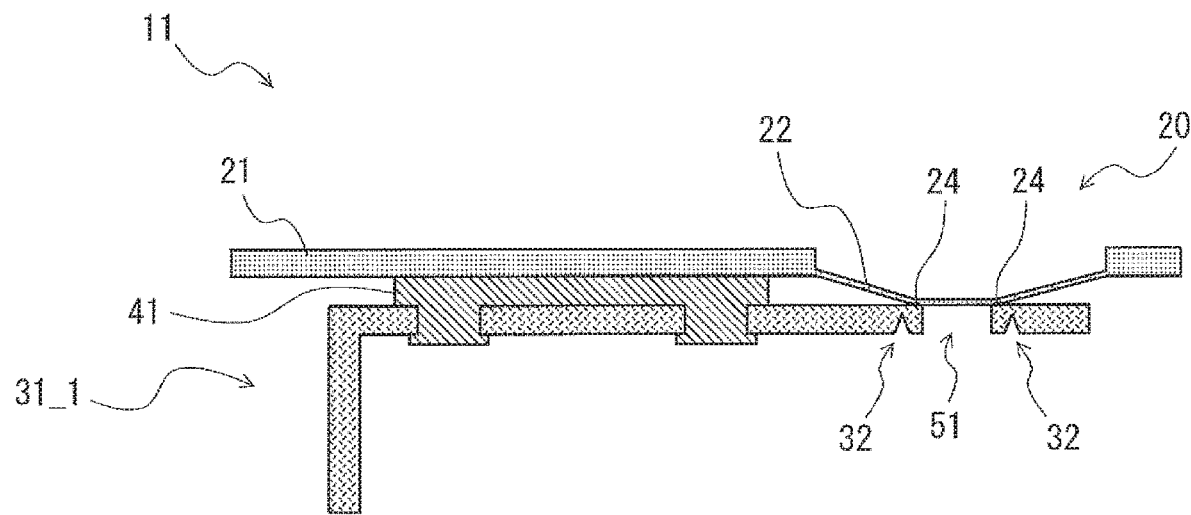
FIG. 8 is a cross section showing a current interrupt mechanism including the collector terminal shown in FIG. 7.
Figure 9:
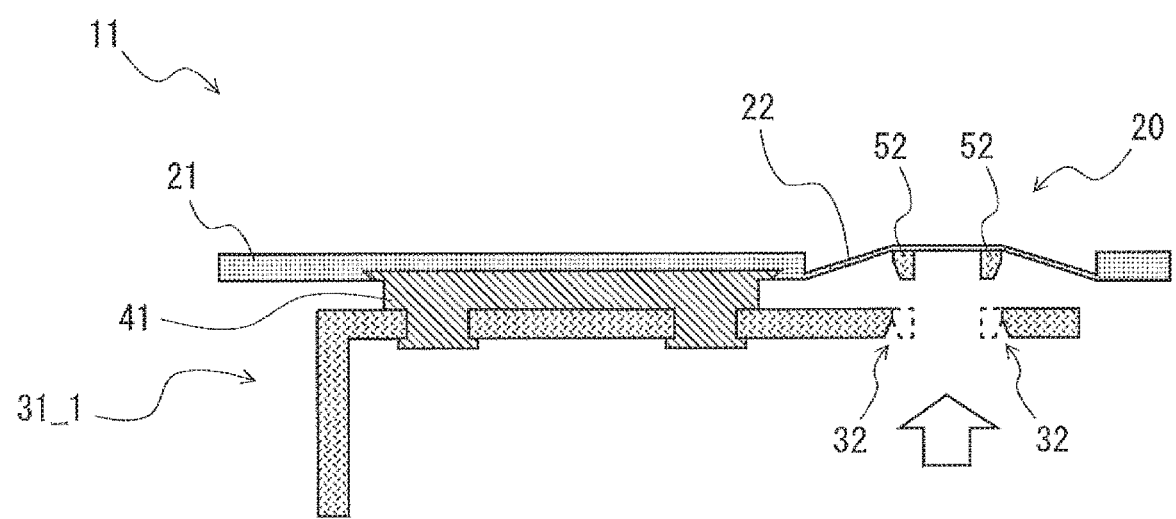
FIG. 9 is a cross section showing a current interrupt mechanism including the collector terminal shown in FIG. 7.

Next, other configuration examples of the collector terminal are explained. FIG. 7 shows a plan view and a cross section showing another configuration example of the collector terminal. In the collector terminal 31_1 shown in FIG. 7, a breakable part 32 is provided and a through-hole 51 is formed within the breakable part 32. The breakable part 32 can be formed by cutting out the surface of the collector terminal 31_1 on the electrode member side (i.e., the bottom surface of the collector terminal 31_1). As shown in FIG. 8, the displacement part 22 is joined with the collector terminal 31_1 in the junction part 24. Further, when the displacement part 22 is displaced outward in response to a rise in the internal pressure of the battery case 10, a part 52 of the collector terminal 31_1 at which the collector terminal 31_1 is joined with the displacement part 22 is broken at the breakable part 32 and separated from the other part of the collector terminal 31_1 as shown in FIG. 9. As a result, the connection between the collector terminal 31_1 and the displacement part 22 is disconnected and hence the current-carrying part 21 is electrically cut off from the collector terminal 31_1.

Figure 10:
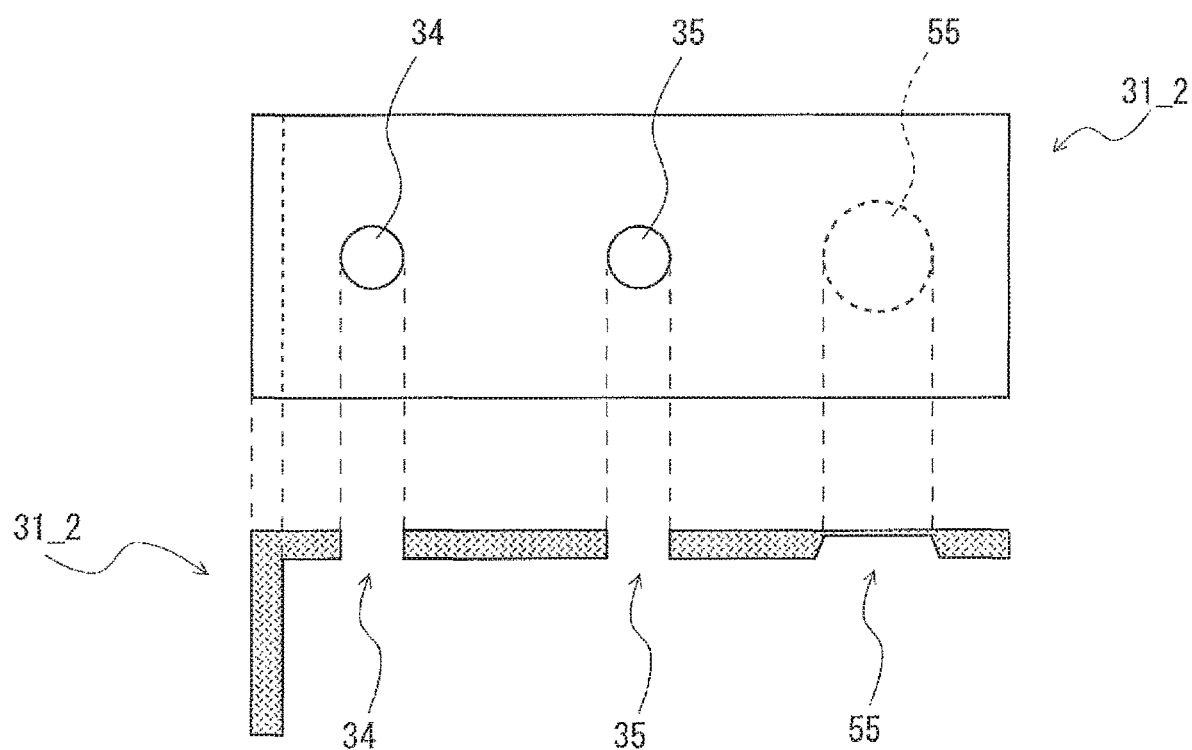
FIG. 10 shows a plan view and a cross section showing another configuration example of a collector terminal.
Figure 11:
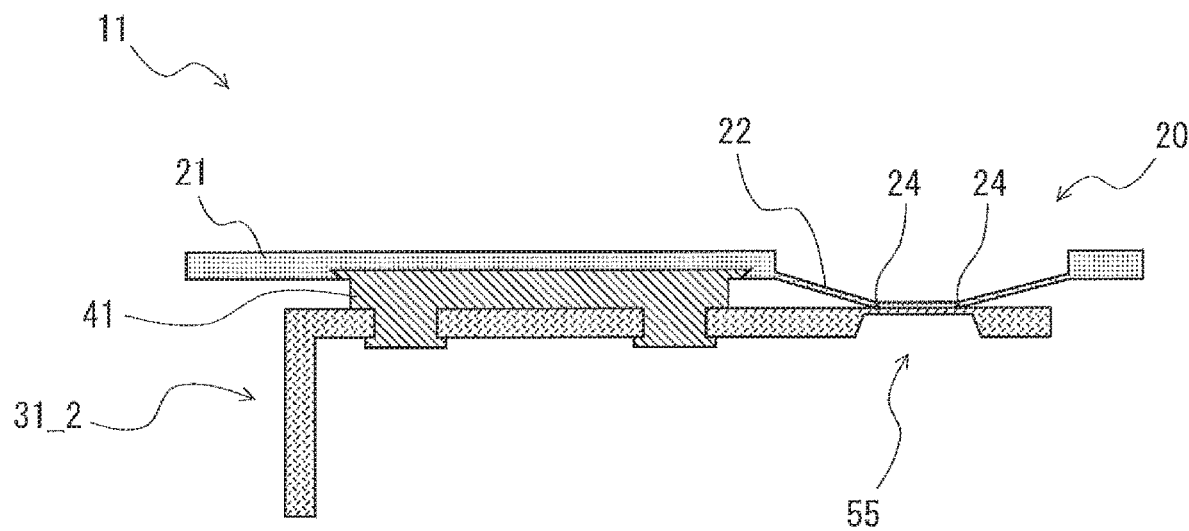
FIG. 11 is a cross section showing a current interrupt mechanism including the collector terminal shown in FIG. 10.
Figure 12:
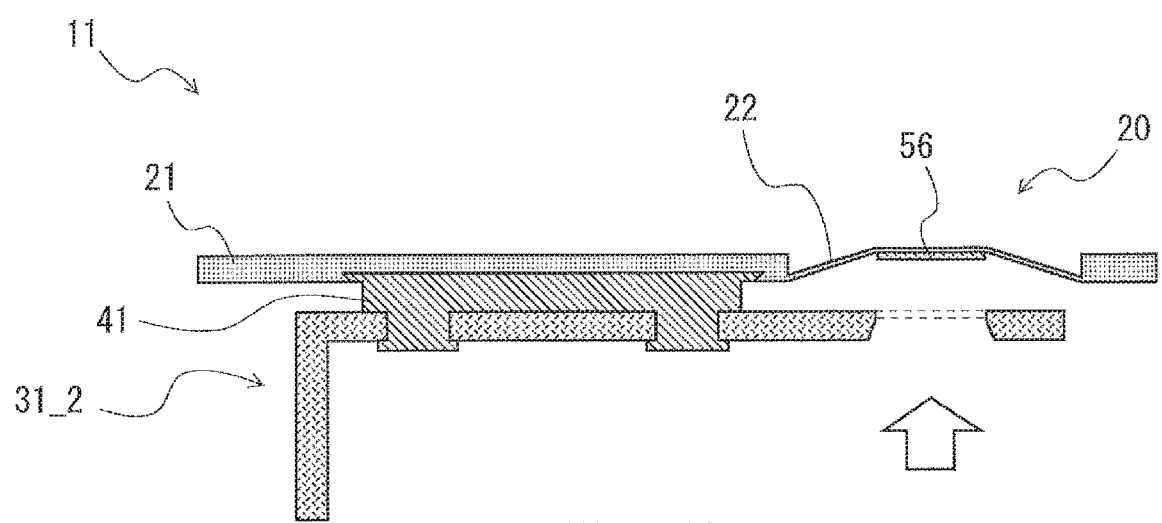
FIG. 12 is a cross section showing a current interrupt mechanism including the collector terminal shown in FIG. 10.

FIG. 10 shows a plan view and a cross section showing another configuration example of the collector terminal. In the collector terminal 31_2 shown in FIG. 10, a breakable part 55 is formed by reducing the thickness of a part of the collector terminal 31_2. That is, as shown in FIG. 11, the breakable part 55 is formed by reducing the thickness of a part including the periphery of the junction part 24. Specifically, the breakable part 55 is formed by hollowing out the surface of the collector terminal 31_2 on the electrode member side (i.e., the bottom surface of the collector terminal 31_2) and thereby shaping the remaining upper part of the collector terminal 31_2 into a thin plate. As shown in FIG. 11, the displacement part 22 is joined with the collector terminal 31_2 in the junction part 24. Further, when the displacement part 22 is displaced outward in response to a rise in the internal pressure of the battery case 10, a part 56 of the collector terminal 31_2 at which the collector terminal 31_2 is joined with the displacement part 22 is broken and separated from the other part of the collector terminal 31_2 as shown in FIG. 12. As a result, the connection between the collector terminal 31_2 and the displacement part 22 is disconnected and hence the current-carrying part 21 is electrically cut off from the collector terminal 31_2.

Figure 13:
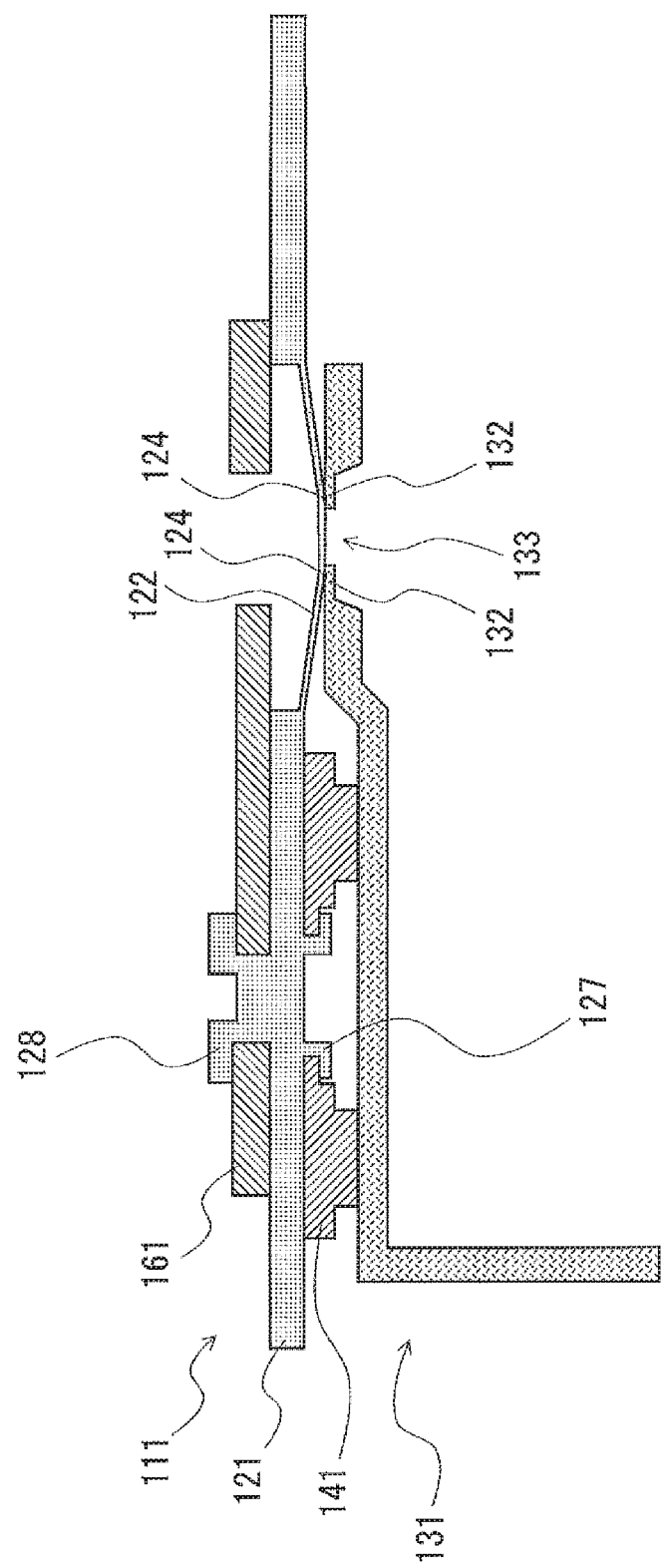
FIG. 13 is a cross section showing another configuration example of a secondary battery according to an embodiment.

FIG. 13 is a cross section showing another configuration example of a secondary battery according to this embodiment. The secondary battery shown in FIG. 13 includes a lid 111, a collector terminal 131, a terminal fixing member 141, and a metal plate 161. The lid 111 includes a current-carrying part 121. A lower rivet 127 and an upper rivet 128 are provided in the current-carrying part 121. Further, a displacement part 122 is formed in the current-carrying part 121. The displacement part 122 is formed so that it can be displaced outward in response to a rise in the internal pressured of the battery case. For example, the current-carrying part 121 may have a plate-like shape, and the displacement part 122 can be formed by making a part of the current-carrying part 121 corresponding to the displacement part 122 thinner than the other part of the current-carrying part 121. For example, the displacement part 122 has a circular shape in a plan view.

The collector terminal 131 can be formed by bending a plate-like metal material into an L-shape. The collector terminal 131 has a plate-like shape at least in a part opposed to the current-carrying part 121. Further, the current-carrying part 121 and the collector terminal 131 are arranged so that their principal surfaces are parallel to each other. The collector terminal 131 is fixed to the current-carrying part 121 by using the terminal fixing member 141 made of a resin material.

Further, a breakable part 132 is formed in the collector terminal 131. The breakable part 132 is formed in a place corresponding to a junction part 124 at which the collector terminal 131 is joined with the displacement part 122. For example, the breakable part 132 can be formed by hollowing out the surface of the collector terminal 131 on the electrode member side (i.e., the bottom surface of the collector terminal 131) and thereby shaping the remaining upper part of the collector terminal 131 into a thin plate, and then forming a through-hole 133 in this thin-plate part. The breakable part 132 is a part having a strength weaker than that of the other part of the collector terminal 131. Therefore, when the displacement part 122 is displaced outward in response to a rise in the internal pressure of the battery case, the breakable part 132 is broken and hence the current-carrying part 121 is electrically cut off from the collector terminal 131.

The displacement part 122 is joined with the collector terminal 131 at a part where the displacement part 122 does not overlap the terminal fixing member 141 in a plan view. For example, laser welding or ultrasonic welding can be used to join the displacement part 122 with the collector terminal 131. In the configuration example shown in FIG. 13, the collector terminal 131 is formed so that a part of the collector terminal 131 including the breakable part 132 protrudes toward the outside of the secondary battery (i.e., protrudes on the lid 111 side).

Further, in the configuration example shown in FIG. 13, the terminal fixing member 141 and the metal plate 161 are fixed to the current-carrying part 121 by using the lower rivet 127 and the upper rivet 128, respectively. Note that the lower rivet 127 and the upper rivet 128 may be integrally formed with the current-carrying part 121 of the lid 111. Alternatively, the lower rivet 127 and the upper rivet 128 may be separately formed from the lid 111 and then joined with the lid 111. The metal plate 161 is connected to an external electrode terminal (not shown).

The configuration example shown in FIG. 13 is fundamentally similar to the configuration of the secondary battery shown in FIG. 2. Therefore, advantageous effects similar to those of the secondary battery shown in FIG. 2 can be achieved in the configuration example shown in FIG. 13. That is, even in the configuration example shown in FIG. 13, since the displacement part 122 is disposed in the lid 111, the thickness of the current interrupt mechanism of the secondary battery can be reduced. Further, in the configuration example shown in FIG. 13, the lower rivet 127 and the upper rivet 128 are disposed in the lower part and the upper part, respectively, of the current-carrying part 121 of the lid 111, and the terminal fixing member 141 and the metal plate 161 are fixed to the current-carrying part 121 by using the lower rivet 127 and the upper rivet 128, respectively. Therefore, it is unnecessary to form through-holes in the lid 111 and hence the gasket is unnecessary.

Figure 14:
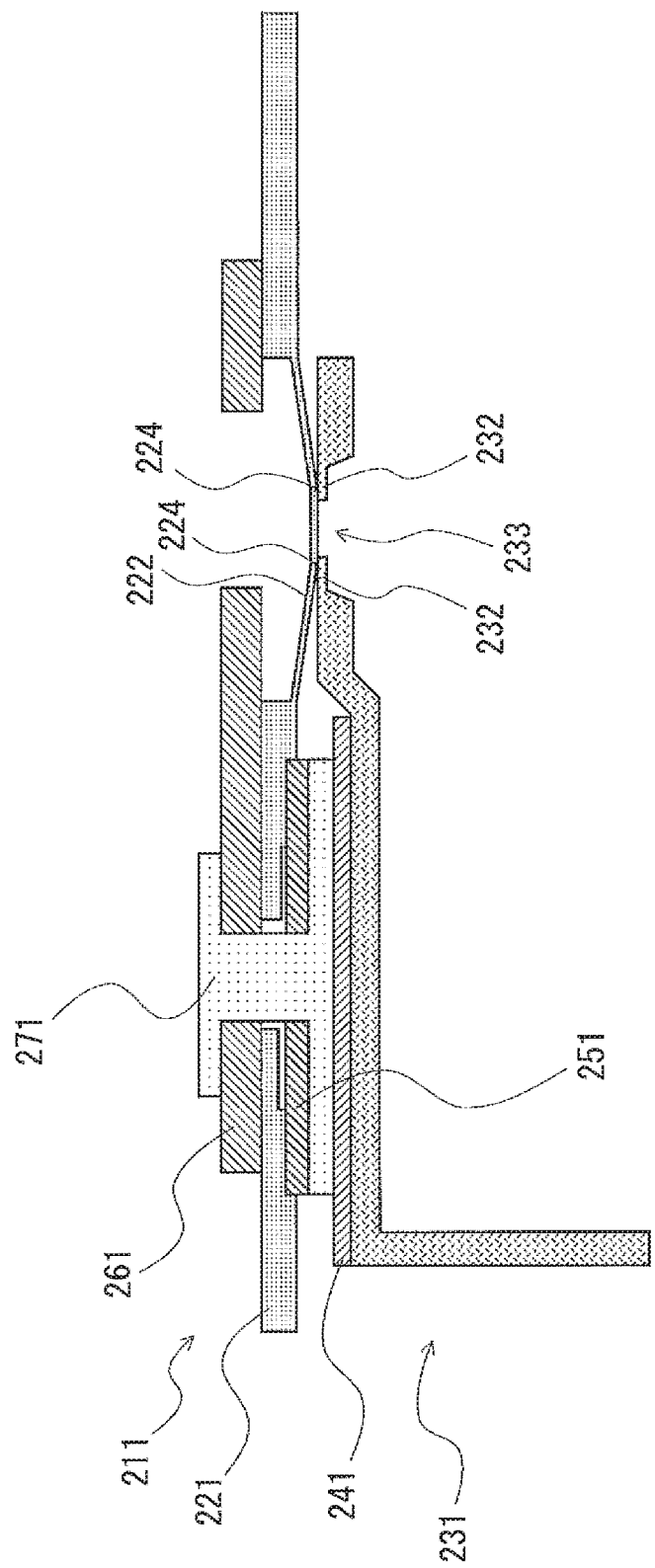
FIG. 14 is a cross section showing another configuration example of a secondary battery according to an embodiment.

FIG. 14 is a cross section showing another configuration example of a secondary battery according to this embodiment. The secondary battery shown in FIG. 14 includes a lid 211, a collector terminal 231, a terminal fixing member 241, a gasket 251, a metal plate 261, and a rivet 271. The lid 211 includes a current-carrying part 221. A through-hole is formed in the current-carrying part 221 and the rivet 271 is disposed in this through-hole. Further, a displacement part 222 is formed in the current-carrying part 221. The displacement part 222 is formed so that it can be displaced outward in response to a rise in the internal pressured of the battery case. For example, the current-carrying part 221 may have a plate-like shape, and the displacement part 222 can be formed by making a part of the current-carrying part 221 corresponding to the displacement part 222 thinner than the other part of the current-carrying part 221. For example, the displacement part 222 has a circular shape in a plan view.

The collector terminal 231 can be formed by bending a plate-like metal material into an L-shape. The collector terminal 231 has a plate-like shape at least in a part opposed to the current-carrying part 221. Further, the current-carrying part 221 and the collector terminal 231 are arranged so that their principal surfaces are parallel to each other. The collector terminal 231 is fixed to the bottom surface of the rivet 271 by using the terminal fixing member 241 made of a resin material.

Further, a breakable part 232 is formed in the collector terminal 231. The breakable part 232 is formed in a place corresponding to a junction part 224 at which the breakable part 232 is joined with the displacement part 222. For example, the breakable part 232 can be formed by hollowing out the surface of the collector terminal 231 on the electrode member side (i.e., the bottom surface of the collector terminal 231) and thereby shaping the remaining upper part of the collector terminal 231 into a thin plate, and then forming a through-hole 233 in this thin-plate part. The breakable part 232 is a part having a strength weaker than that of the other part of the collector terminal 231. Therefore, when the displacement part 222 is displaced outward in response to a rise in the internal pressure of the battery case, the breakable part 232 is broken and hence the current-carrying part 221 is electrically cut off from the collector terminal 231.

The displacement part 222 is joined with the collector terminal 231 at a part where the displacement part 222 does not overlap the terminal fixing member 241 in a plan view. For example, laser welding or ultrasonic welding can be used to join the displacement part 222 with the collector terminal 231. In the configuration example shown in FIG. 14, the collector terminal 231 is formed so that a part of the collector terminal 231 including the breakable part 232 protrudes toward the outside of the secondary battery (i.e., protrudes on the lid 211 side).

Further, in the configuration example shown in FIG. 14, the gasket 251, the current-carrying part 221, and the metal plate 261 are fixed in a stacked state by using the rivet 271. The collector terminal 231 is fixed to the bottom surface of the rivet 271 by using the terminal fixing member 241. As a result, the collector terminal 231 is fixed to the current-carrying part 221. In the configuration example shown in FIG. 14, since the rivet 271 passes through the current-carrying part 221, the gasket 251 needs to be disposed. The metal plate 261 is connected to an external electrode terminal (not shown).

Although the gasket 251 is disposed in the configuration example shown in FIG. 14, the other configuration of the secondary battery is fundamentally similar to the configuration of the secondary battery shown in FIG. 2. Therefore, advantageous effects similar to those of the secondary battery shown in FIG. 2 can be achieved in the configuration example shown in FIG. 14. That is, even in the configuration example shown in FIG. 14, since the displacement part 222 is disposed in the lid 211, the thickness of the current interrupt mechanism of the secondary battery can be reduced.

Figure 15:
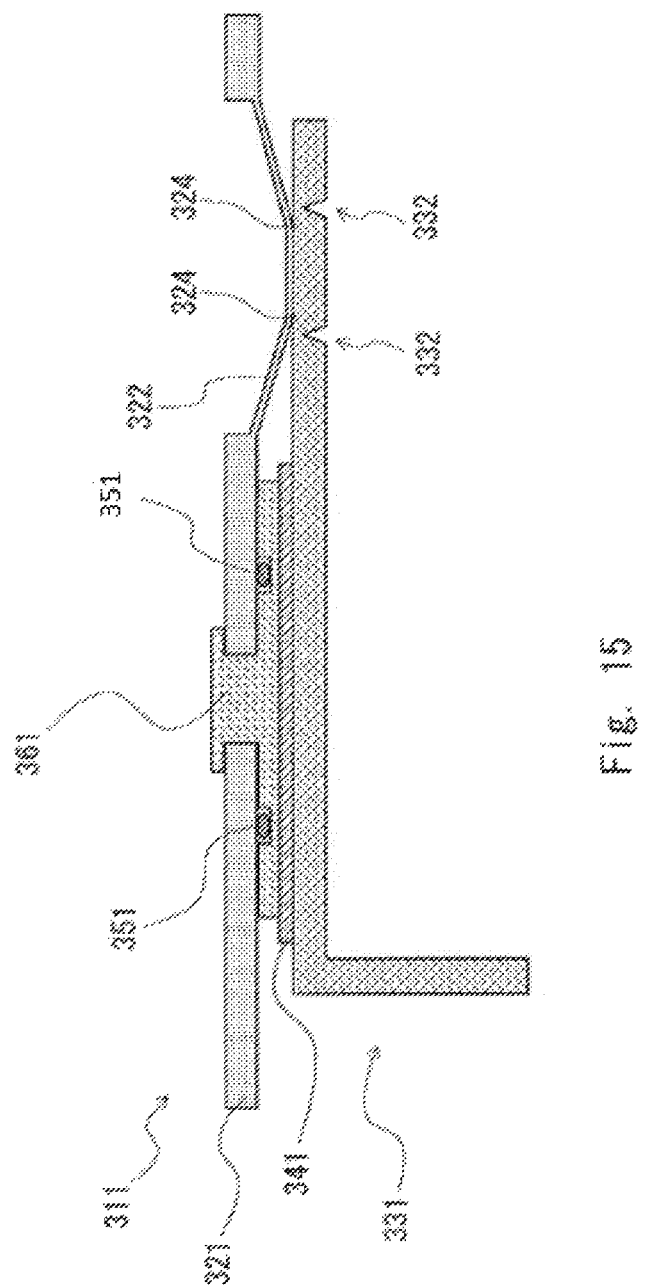
FIG. 15 is a cross section showing another configuration example of a secondary battery according to an embodiment.

FIG. 15 is a cross section showing another configuration example of a secondary battery according to this embodiment. The secondary battery shown in FIG. 15 includes a lid 311, a collector terminal 331, a terminal fixing member 341, a gasket 351, and a rivet 361. The lid 311 includes a current-carrying part 321. A through-hole is formed in the current-carrying part 321 and the rivet 361 is disposed in this through-hole. Further, a displacement part 322 is formed in the current-carrying part 321. The displacement part 322 is formed so that it can be displaced outward in response to a rise in the internal pressured of the battery case. For example, the current-carrying part 321 may have a plate-like shape, and the displacement part 322 can be formed by making a part of the current-carrying part 321 corresponding to the displacement part 322 thinner than the other part of the current-carrying part 321. For example, the displacement part 322 has a circular shape in a plan view.

The collector terminal 331 can be formed by bending a plate-like metal material into an L-shape. The collector terminal 331 has a plate-like shape at least in a part opposed to the current-carrying part 321. Further, the current-carrying part 321 and the collector terminal 331 are arranged so that their principal surfaces are parallel to each other. The collector terminal 331 is fixed to the bottom surface of the rivet 361 by using the terminal fixing member 341 made of a resin material.

Further, a breakable part 332 is formed in the collector terminal 331. The breakable part 332 is formed around the junction part 324 at which the collector terminal 331 is joined with the displacement part 322. For example, the breakable part 332 can be formed by cutting out the surface of the collector terminal 331 on the electrode member side (i.e., the bottom surface of the collector terminal 331) in such a manner that the breakable part 332 surrounds the junction part 324. The breakable part 332 is a part having a strength weaker than that of the other part of the collector terminal 331. Therefore, when the displacement part 322 is displaced outward in response to a rise in the internal pressure of the battery case, the breakable part 332 is broken and hence the current-carrying part 321 is electrically cut off from the collector terminal 331.

The displacement part 322 is joined with the collector terminal 331 at a part where the displacement part 322 does not overlap the terminal fixing member 341 in a plan view. For example, laser welding or ultrasonic welding can be used to join the displacement part 322 with the collector terminal 331.

Further, in the configuration example shown in FIG. 15, the rivet 361 passes through the current-carrying part 321 and is fixed to the current-carrying part 321. Further, the collector terminal 331 is fixed to the bottom surface of the rivet 361 by using the terminal fixing member 341. As a result, the collector terminal 331 is fixed to the current-carrying part 321. The gasket 351 is disposed between the rivet 361 and the current-carrying part 321. In the configuration example shown in FIG. 15, since the rivet 361 passes through the current-carrying part 321, the gasket 351 needs to be disposed.

Although the gasket 351 is disposed in the configuration example shown in FIG. 15, the other configuration of the secondary battery is fundamentally similar to the configuration of the secondary battery shown in FIG. 2. Therefore, advantageous effects similar to those of the secondary battery shown in FIG. 2 can be achieved in the configuration example shown in FIG. 15. That is, even in the configuration example shown in FIG. 15, since the displacement part 322 is disposed in the lid 311, the thickness of the current interrupt mechanism of the secondary battery can be reduced.

Note that the present disclosure is not limited to the above-described embodiments, and various modifications can be made without departing from the spirit and scope of the present disclosure. For example, although configurations in which a current interrupt mechanism is disposed on the positive side of a secondary battery are explained in the above-described embodiments, the current interrupt mechanism may be disposed on the negative side of a secondary battery in other embodiments.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A secondary battery comprising:
    a battery case having an open top,
    an electrode member contained in the battery case,
    an external electrode terminal disposed at an outer side of the battery case,
    a collector terminal of the electrode member,
    a lid configured to close the open top of the battery case and hermetically seal the battery case, wherein
    the lid includes:
        a current-carrying part, which electrically connects the collector terminal of the electrode member with the external electrode terminal,
        a displacement part configured to be displaced outward in response to a rise in an internal pressure of the battery case, the displacement part being connected to at least a part of the collector terminal, and
    a terminal fixing member made of a resin material that fixes the collector terminal to the current-carrying part, wherein:
        the current-carrying part has a plate-like shape,
        the collector terminal has a plate-like shape at least in a part opposed to the current-carrying part,
        the current-carrying part and the collector terminal are arranged so that their principal surfaces are parallel to each other,
        recesses formed on a bottom surface of the current-carrying part,
        protrusions of the terminal fixing member are press-fit into the recesses formed on the bottom surface of the current-carrying part so as to fix the collector terminal to the current-carrying part,
        the terminal fixing member does not overlap with any portion of the displacement part when viewed from above the lid, and
    when the displacement part is displaced outward in response to the rise in the internal pressure of the battery case, the connection between the displacement part and the collector terminal is disconnected and the current-carrying part is electrically cut off from the collector terminal.

2. The secondary battery according to claim 1, wherein
    a breakable part is formed around a junction part of the collector terminal at which the collector terminal is joined with the displacement part, and
    when the displacement part is displaced outward in response to the rise in the internal pressure of the battery case, the breakable part is broken and hence the current-carrying part is electrically cut off from the collector terminal.

3. The secondary battery according to claim 2, wherein
    the displacement part is formed with a thickness smaller than the thickness of an area around the displacement part so that the displacement part is displaced in a thickness direction of the current-carrying part.

4. The secondary battery according to claim 3, wherein
    when the current-carrying part and the collector terminal are viewed from above,
    the displacement part has a circular shape,
    the junction part at which the displacement part is joined with the collector terminal has a circular shape, and
    the breakable part is formed in a circular shape around the junction part of the collector terminal.

5. The secondary battery according to claim 3, wherein the breakable part is formed by cutting out a surface of the plate-like collector terminal on the electrode member side in such a manner that the breakable part surrounds the junction part.

6. The secondary battery according to claim 3, wherein the breakable part is formed by reducing the thickness of a part of the plate-like collector terminal including a periphery of the junction part.

* * * * *